United States Patent
Schmehl

(10) Patent No.: US 9,519,416 B2
(45) Date of Patent: Dec. 13, 2016

(54) SYSTEM AND METHOD TO DISPLAY A PROGRESS BAR

(71) Applicant: AT&T INTELLECTUAL PROPERTY I, L.P., Atlanta, GA (US)

(72) Inventor: Ian Schmehl, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 99 days.

(21) Appl. No.: 14/254,686

(22) Filed: Apr. 16, 2014

(65) Prior Publication Data

US 2014/0229830 A1  Aug. 14, 2014

Related U.S. Application Data

(63) Continuation of application No. 12/335,796, filed on Dec. 16, 2008, now Pat. No. 8,737,800.

(51) Int. Cl.
| | |
|---|---|
| *H04N 9/80* | (2006.01) |
| *G06F 3/0485* | (2013.01) |
| *H04N 5/445* | (2011.01) |
| *H04N 21/41* | (2011.01) |
| *H04N 21/431* | (2011.01) |
| *H04N 21/472* | (2011.01) |
| *H04N 21/488* | (2011.01) |
| *H04N 21/81* | (2011.01) |

(52) U.S. Cl.
CPC ...... *G06F 3/04855* (2013.01); *H04N 5/44513* (2013.01); *H04N 21/4104* (2013.01); *H04N 21/4312* (2013.01); *H04N 21/47217* (2013.01); *H04N 21/4886* (2013.01); *H04N 21/8126* (2013.01)

(58) Field of Classification Search
CPC .................. H04N 21/47217; H04N 5/44513; G06F 3/04855
USPC ................................ 386/206, 218, 219, 248
See application file for complete search history.

(56) References Cited

U.S. PATENT DOCUMENTS

| | | | |
|---|---|---|---|
| 5,995,162 A * | 11/1999 | Fujimori | ............ H04N 5/44513 348/177 |
| 6,744,967 B2 | 6/2004 | Kaminski et al. | |
| 2003/0023427 A1 | 1/2003 | Cassin et al. | |
| 2003/0121055 A1* | 6/2003 | Kaminski | ............... H04N 5/781 725/115 |
| 2005/0163481 A1 | 7/2005 | Hirai | |
| 2007/0061495 A1 | 3/2007 | Cummins et al. | |
| 2007/0133607 A1* | 6/2007 | Park | ................... H04N 21/4147 370/484 |
| 2007/0157248 A1 | 7/2007 | Ellis | |
| 2007/0198111 A1 | 8/2007 | Oetzel et al. | |
| 2008/0107402 A1* | 5/2008 | Angiolillo | ............ H04N 5/4403 386/234 |
| 2008/0111822 A1 | 5/2008 | Horowitz et al. | |

(Continued)

*Primary Examiner* — Thai Tran
*Assistant Examiner* — Jose Mesa
(74) *Attorney, Agent, or Firm* — Toler Law Group, PC

(57) ABSTRACT

A method includes receiving an input at a media display control device and performing a media control function in response to the input, where the media control function causes the media display control device to change a playback parameter of displayed media content. The method further includes determining a control value corresponding to the media control function and, based on the control value satisfying a threshold, displaying a progress bar with the displayed media content.

20 Claims, 6 Drawing Sheets

(56) References Cited

U.S. PATENT DOCUMENTS

2008/0249694 A1 10/2008 Jaenke et al.
2009/0179909 A1 7/2009 Fernandez et al.
2009/0259926 A1 10/2009 Deliyannis

* cited by examiner

SYSTEM AND METHOD TO DISPLAY A PROGRESS BAR

PRIORITY CLAIM

The present application is a continuation of and claims priority from U.S. patent application Ser. No. 12/335,796, filed on Dec. 16, 2008, and entitled "SYSTEM AND METHOD TO DISPLAY A PROGRESS BAR", the contents of which are expressly incorporated herein by reference in their entirety.

FIELD OF THE DISCLOSURE

The present disclosure is generally related to displaying a progress bar.

BACKGROUND

Many media programs include a ticker that displays information related to the media program. For example, a financial program may broadcast a stock market ticker that displays information related to stock prices and a sports-related program may broadcast a ticker that displays sporting event scores and related information. The information displayed by the ticker may be periodically modified to include updated information. Locating a particular portion of ticker information that is of interest to the viewer may be inconvenient. For example, the viewer may be interested in the current stock price of a particular stock or the current score of a particular sporting event and may miss viewing the ticker information of interest when the viewer is distracted by another event, such as receiving a telephone call.

When the viewer has a digital video recorder (DVR), one way to locate a particular portion of the ticker information is to rewind the DVR to view recent ticker information. However, the DVR may display a progress bar during operations that advance or regress the media content, such as when a fast-forward or rewind function is performed. The progress bar visually indicates the progress of the operation being performed. The progress bar may be displayed in an area of the screen that overlaps the ticker, making it difficult for the viewer to identify the particular portion of the ticker information that the viewer is interested in viewing.

DETAILED DESCRIPTION

Figure 1:
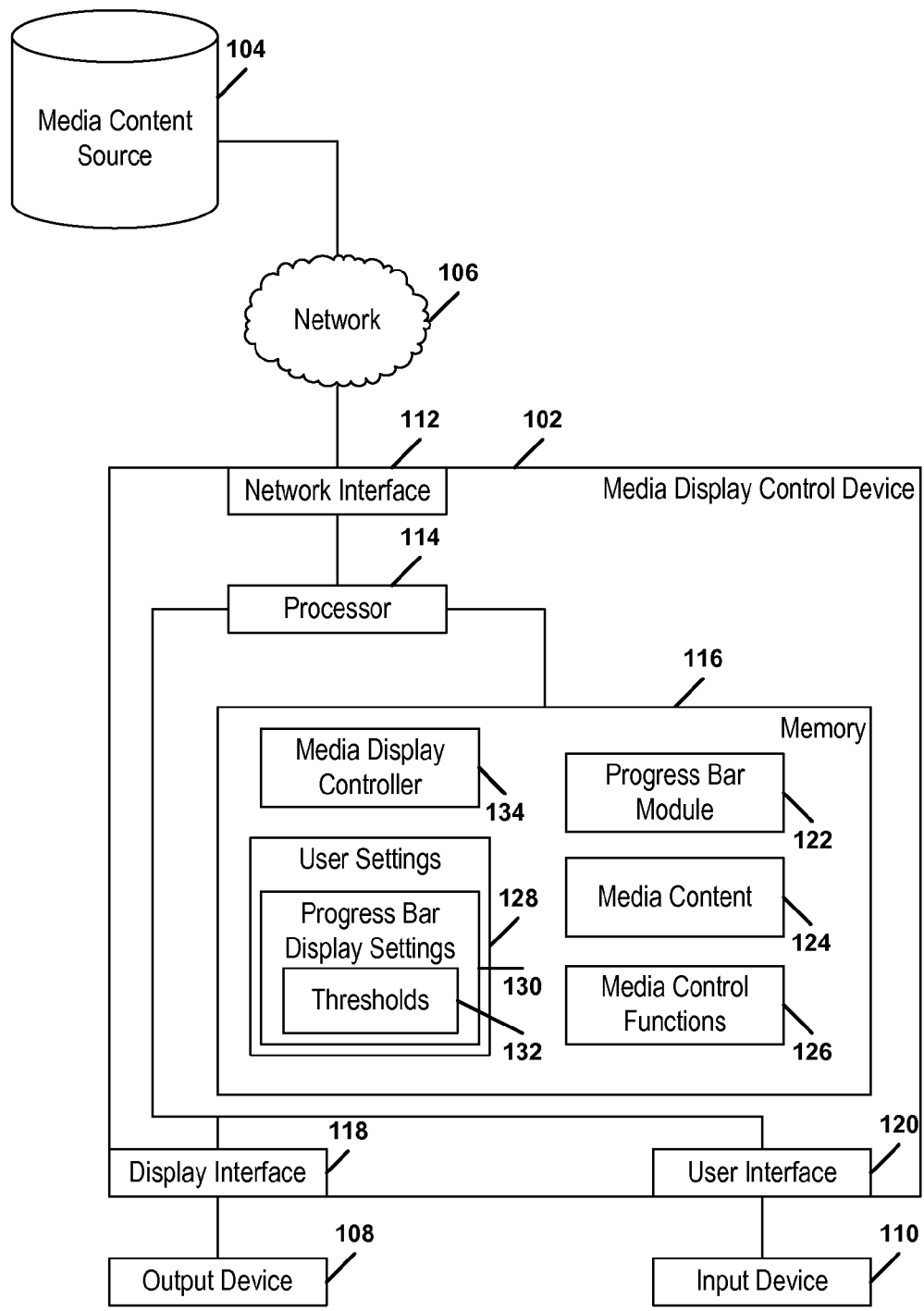
FIG. 1 is a block diagram of a system for displaying media content.

In a particular embodiment, a method includes receiving input at a media display control device generating a display of media content. The method includes executing a media control function in response to the input. Executing the media control function causes the media display control device to advance or rewind the media content displayed by a change amount. The method also includes displaying a progress bar based on progress bar settings. The progress bar settings include progress bar display options that depend on the change amount.

In another particular embodiment, a computer-readable storage medium, includes operational instructions that, when executed by a processor, cause the processor to execute a media control function in response to input received at a media display control device. The media control function changes a time index of media content displayed via the media display control device by a change amount. The computer-readable storage medium includes operational instructions that, when executed by the processor, cause the processor to display a progress bar based on progress bar settings. The progress bar settings include progress bar display options that depend on the change amount.

In another particular embodiment, a media display control device includes a user interface to receive input to initiate a media control function. The media display control device includes a media display controller to modify a display of media content in response to the media control function by advancing to a subsequent portion of the media content or regressing to an earlier portion of the media content. The media display control device also includes a progress bar module to select progress bar display settings based on a change amount. The change amount indicates how much the media content was advanced or regressed. The media display control device also includes a display interface to send the display of media content to a display device and to include a progress bar in the display of media content. The progress bar is included in the display of media content based upon the selected progress bar display settings.

In another particular embodiment, a method includes generating a display of media content and sending the display to a display device. The method includes receiving a replay command at a media display control device. The replay command indicates that a portion of the media content is to be replayed. The method includes determining a duration of the portion of the media content to be replayed. The method also includes accessing a plurality of progress bar display settings. Each progress bar display setting has a corresponding replay duration threshold. Each progress bar display setting specifies a display characteristic of a progress bar to be displayed in response to the replay command. The method includes selecting a progress bar display setting from the plurality of progress bar display settings based upon the duration of the portion of the media content. The method also includes displaying a progress bar at the display device based upon the selected progress bar display setting.

FIG. 1 depicts a particular embodiment of a system for displaying media content. The system includes a media display control device 102 coupled to a media content source 104 via a network 106. The media display control device 102 is also coupled to an output device 108, such as a television or other display device, and to an input device 110, such as a remote control device. In a particular embodiment, the media display control device 102 is a set-top box device. For example, the media display control device 102 may include a module that enabled media content to be displayed at the output device 108 and enables advancing and regressing of the displayed media content.

The media display control device 102 includes a network interface 112 to communicate with the network 106, a display interface 118 to communicate with the output device 108, and a user interface 120 to communicate with the input device 110. The media display control device 102 also includes a memory 116 accessible to a processor 114. Media content 124 is received from the media content source 104 and stored at the memory 116 for display at the output device 108. Storing the media content 124 at the memory 116 enables a user to advance (fast-forward) or regress (rewind) the media content 124 when the media content 124 is displayed at the output device 108. The media display control device 102 includes a processor 114 adapted to process the media content 124 received from the media content source 104 for display at the output device 108.

In a particular embodiment, the memory 116 includes a media display controller 134. The media display controller 134 is adapted to modify a display of the media content 124 sent to the output device 108 in response to a media control function 126. For example, the media control function 126 may advance the media content 124 to a subsequent portion of the media content 124 or regress the media content 124 to an earlier portion of the media content 124.

The memory 116 also includes a progress bar module 122. The progress bar module 122 is adapted to select progress bar display settings 130 based on an amount of the change in the media content 124. The change amount indicates how much of the media content 124 was advanced or regressed. For example, the change amount may indicate an amount of time that the media content 124 was advanced or regressed. To illustrate, the change amount may indicate that the media content 124 was advanced or regressed by sixty seconds. In a particular embodiment, the progress bar display settings 130 may be stored with other user settings 128. The user settings 128 and the progress bar display settings 130 may be specified by the user. Alternately, the progress bar display settings 130 may include default settings stored at the memory 116 outside the user settings 128 and may not be modifiable by the user. For example, the progress bar display settings 128 may include default settings specified by a manufacturer of the media display control device 102, by a service provider associated with the media control display device 102, or by the media content source 104.

In a particular embodiment, the progress bar display settings 130 include one or more thresholds 132. The thresholds 132 may indicate which progress bar display settings 128 are selected based on characteristics of the media content 124, amount of change of the media content being advanced or being regressed, or any combination thereof. In a particular embodiment, the display interface 118 sends the media content 124 to the output device 118 and includes a progress bar in the displayed media content based on the progress bar display settings 130.

The progress bar display settings 130 may specify that when a particular threshold 132 is met, the progress bar is to be displayed at the output device 108 for a particular duration. The progress bar display settings 130 may also specify characteristics of the media content 124 that modify the progress bar display. For example, a predominant color of the media content 124 may be used to select a display color of the progress bar. In another example, a type of the media content 124 may be used to select an opacity, a duration, a color, or a location of the progress bar in the display. In another example, a duration of a program of the media content 124 may be used to select the progress bar display settings 130. In another example, the amount of media content 124 advanced or regressed may be used to select the progress bar display settings 130. To illustrate, when the media content 124 is advanced or regressed by sixty seconds or less, no progress bar may be displayed and when the media content 124 is advanced or regressed by more than sixty seconds, the progress bar may be displayed.

Thus, a user viewing the media content 124 may specify the progress bar display settings 128 such that the user may advance or regress the media content 124 without the progress bar obstructing a particular area of the display, such as a ticker display area. For example, the progress bar may be displayed at a different location of the display or at a low opacity level when the media content 124 is advanced or regressed for a time duration less than the thresholds 132 to provide an unobstructed view of a particular portion of the display.

Figure 2:
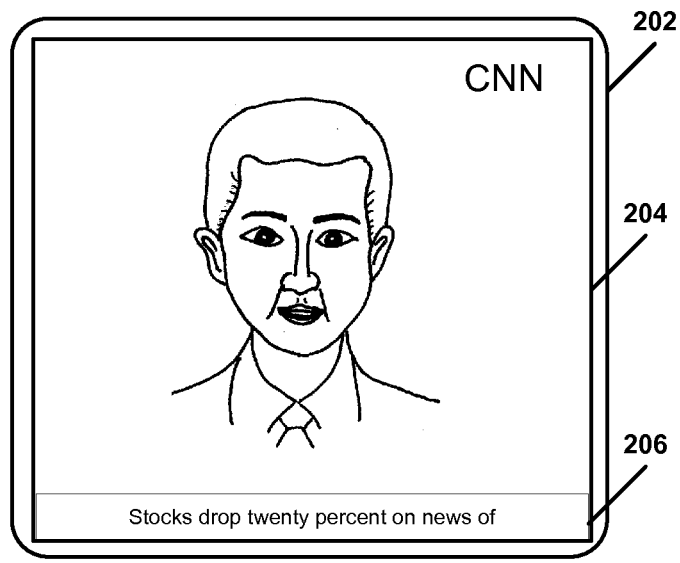
FIG. 2 is a diagram of a first particular embodiment of a media display including media content.

FIG. 2 depicts a first particular embodiment of a media display 202 including media content 204. The media content 204, as illustrated in FIG. 2, includes a ticker display 206. In a particular embodiment, the ticker display 206 may include text that runs along the bottom, top or sides of the media display 202 along with the rest of the media content 204. For example, during certain types of programs, such as news programs or sports programs, the ticker display 206 may present information associated with or supplementary to the media content 204.

Figure 3:
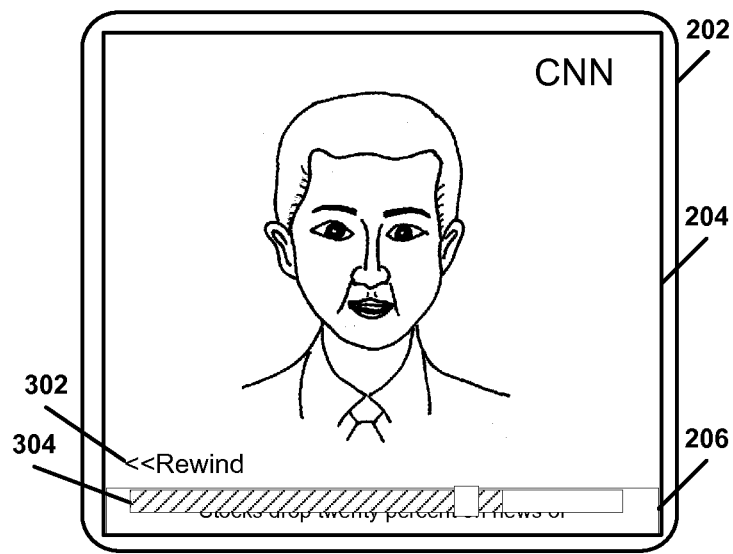
FIG. 3 is a diagram of a second particular embodiment of a media display including media content.

FIG. 3 depicts a second particular embodiment of the media display 202 including the media content 204 and the ticker display 206. As illustrated in FIG. 3, a media control function has been received at a media control display device associated with the media display 202. In a particular example, the media control function includes a rewind function 302. In response to the rewind function 302, the media content 204 may be regressed to replay a particular portion of the media content 204. In addition, a progress bar 304 may be displayed. As illustrated in FIG. 3, the progress bar 304 may obscure at least a portion of the media content display 202. For example, the progress bar 304 may be displayed at the bottom of the screen, thereby obscuring the ticker display 206.

Figure 4:
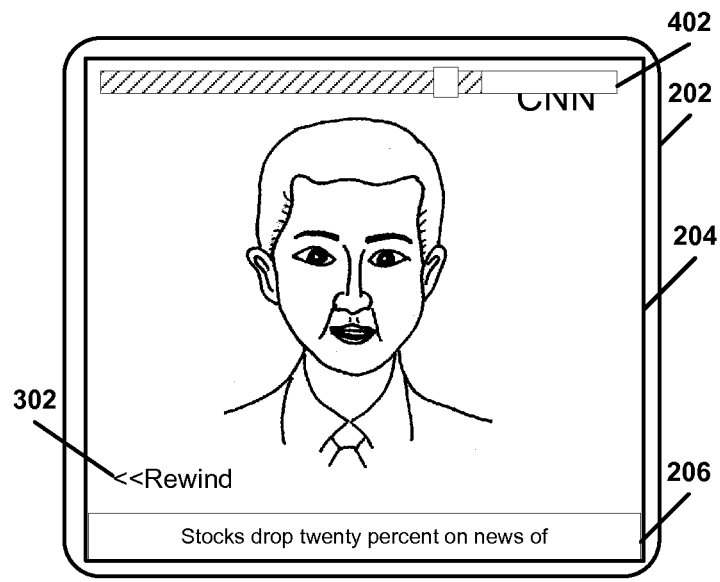
FIG. 4 is a diagram of a third particular embodiment of a media display including media content.

FIG. 4 depicts a third particular embodiment of a media display 202 including the media content 204 and the ticker display 206. As illustrated in FIG. 4, the rewind command 302 has been received and the media content 204 has been regressed as illustrated by a progress bar 402. In response to determining that the media content 404 is of a particular type, such as a news program or sports program, or that the media content includes a particular feature, such as the ticker display 206, the progress bar 402 is displayed at a different location than the rewind function indication 302 of FIG. 3. In particular, the progress bar 402 has been presented at a top of the media display 202.

Figure 5:
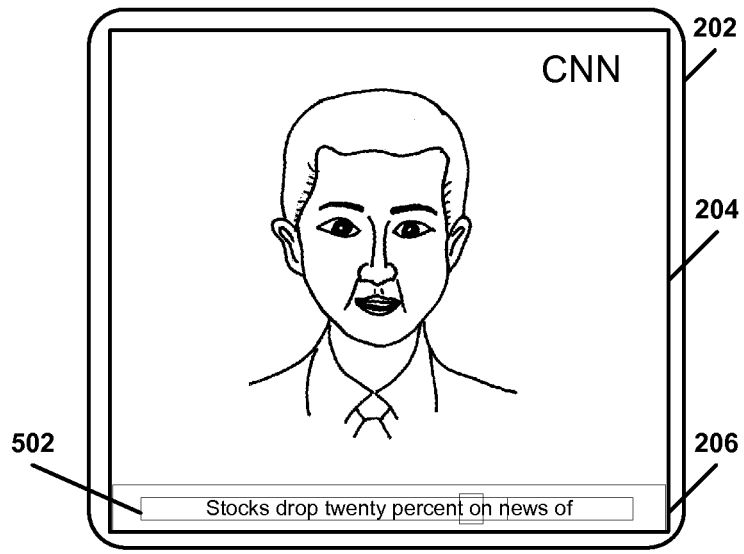
FIG. 5 is a diagram of a fourth particular embodiment of a media display including media content.

FIG. 5 depicts a fourth particular embodiment of a media display 402 including media content 204 and a ticker display 206. As illustrated in FIG. 5, a rewind command has been executed to regress a portion of the media content 204 that is displayed. In addition, a progress bar 502 is presented indicating a progress of the rewind command. In response to determining a type of the media content 204 or content of the media content 204, the progress bar 502 may be displayed translucently, i.e. with a reduced opacity, as illustrated in FIG. 5. The translucency of the progress bar 502 enables the ticker display 206 to be visible through the progress bar 502 without obscuring information presented via the ticker display 206.

Figure 6:
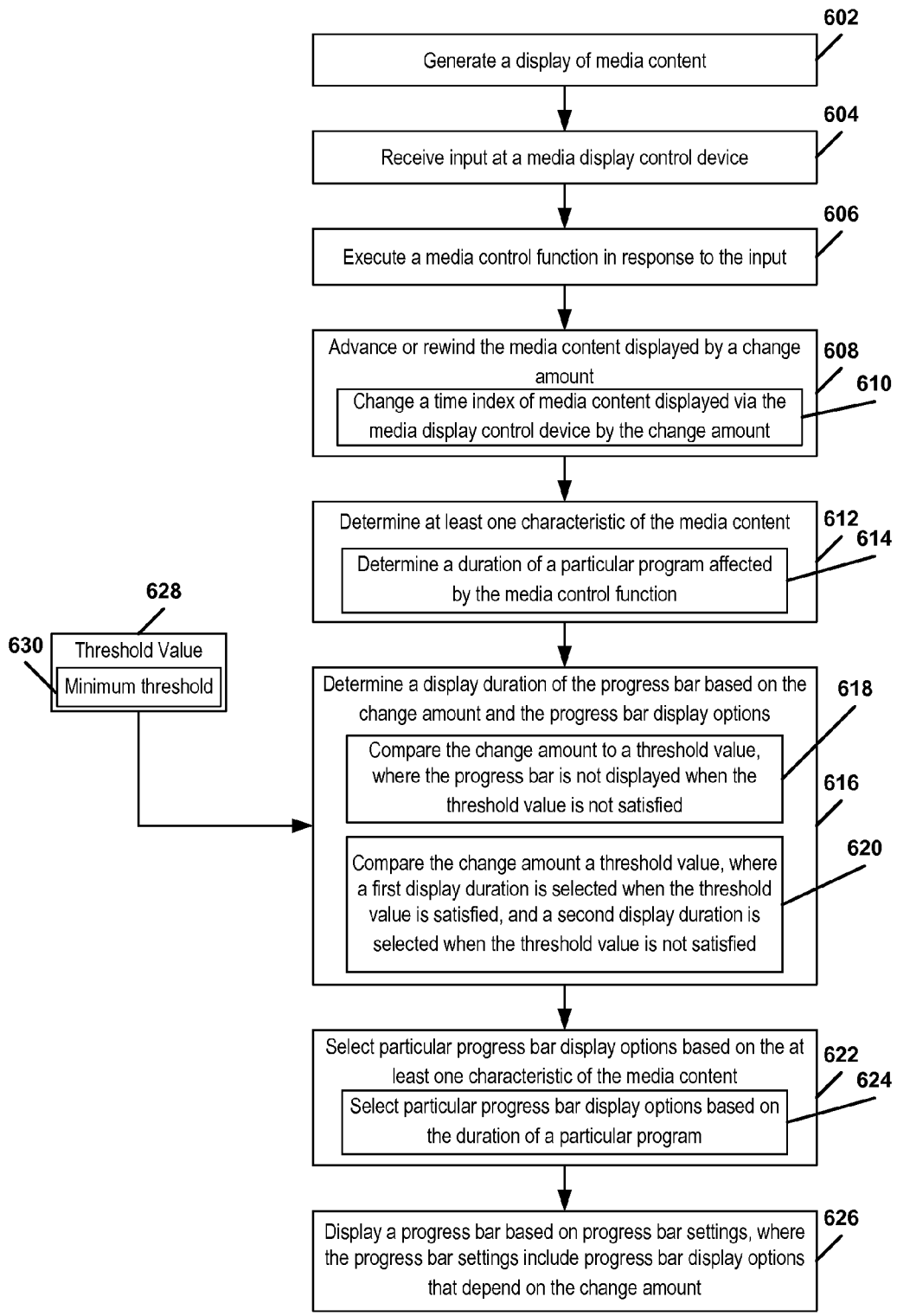
FIG. 6 is a flow diagram of a first particular embodiment of a method of generating a progress bar display.

FIG. 6 depicts a flow diagram of a first particular embodiment of a method of generating a progress bar display. The method includes, at 602, generating a display of media content. For example, the media content may include video content, such as television content, video-on-demand content, pay-per-view content, or any combination thereof The method also includes, at 604, receiving input at a media display control device. The media display control device may include a set-top box device or another device coupled to or integrated within a display device to control the media content presented via the display device. In a particular embodiment, the media display control device may include a television. In another particular embodiment, the media display control device may include a portable device with an integrated display, such as a media enabled mobile communication device.

In a particular embodiment, a media control function may be executed in response to the received input, at 606. The media control function may include a rewind function to regress media content, a fast forward function to advance the media content, a skip function to advance or regress the media content a predetermined amount, or another function to modify the display of media content. The method also includes, at 608, advancing or rewinding the media content displayed by a change amount. For example, the media content may be associated with a time index. The time index may indicate a location of each frame of the media content with respect to other frames of the media content. For example, frames of the media content may be numbered sequentially to indicate an order in which the frames are to be displayed. The media control function may change the time index of the media content displayed via the media display control device by a particular change amount. For example, the media control function may advance or regress the time index by a predetermined amount. For example, the media control function may advance or regress the time index by sixty seconds.

The method also includes, at 612, determining at least one characteristic of the media content. For example, the method may include, at 614, determining a duration of a particular program affected by the media control function. For example, the method may include determining that a particular program of the media content has a duration of one minute (such as, for an advertisement), has a display duration of five minutes (such as, for a short video), has a display duration of half an hour (such as, for a television program), has a display duration of two hours (such as, for a movie), or has another display duration. Additionally, one or more other characteristics of the media content may be determined, at 612. For example, a primary display color of the media content may be determined indicating that the media content displayed at the display device includes a high proportion or a particular proportion of a particular color or hue. In another example, the characteristics may include a type of the media content. To illustrate, the type of the media content may include a sports program, a news program, or another type of program.

The method also includes, at 616, determining a display duration of a progress bar based on the change amount and based on progress bar display options. In a particular embodiment, the progress bar display options depend upon the change amount. The progress bar display options may specify a size of the progress bar in the display, a duration to display the progress bar, a color of the progress bar in the display, a location of the progress bar, an opacity or translucency of the progress bar in the display, other characteristics of the progress bar displayed at the display device, or any combination thereof In a particular embodiment, determining the display duration of the progress bar includes, at 618, comparing the change amount to a threshold value 628. When a minimum threshold 630 is not satisfied by the change amount, the progress bar is not displayed. For example, the progress bar may not be displayed when the change amount is sixty seconds or less and may be displayed when the change amount is greater than sixty seconds.

In a particular embodiment, determining the displayed duration of the progress bar includes, at 620, comparing the change amount to the threshold value 628 where a first display duration is selected when the threshold value 628 is satisfied and a second display duration is selected when the threshold value 628 is not satisfied. The threshold value 628 may include a plurality of threshold values. For example, the threshold value 628 may be associated with three or more separate displayed durations that depend upon the change amount. In another particular embodiment, the display duration of the progress bar may be determined as a proportion of the change amount. For example, the progress bar may be displayed for a duration that is a fixed percentage of the change amount. In another example, the display duration of the progress bar may be determined as a variable portion of the change amount based on the threshold value 628.

The method also includes, at 622, selecting particular progress bar display options based on at least one characteristic of the media content. For example, the method may include, at 624, selecting a particular progress bar display option based on the duration of the particular program. To illustrate, when the program is a one minute program, the progress bar display options may specify that the progress bar is not to be displayed. In another example, when the duration of the particular program is greater than a threshold amount, such as greater than one minute, the progress bar display options may specify a first set of threshold values 628. In another illustration, when the duration of the particular program is greater than a second amount, such as thirty minutes, the progress bar display options may specify a second set of threshold values 628. Thus, the duration of the particular program may be used to vary the threshold values 628. For example, the progress bar may be displayed for a shorter duration for shorter duration programs and for a longer duration for longer duration programs. To illustrate, when a particular program has a duration of thirty minutes or less, the threshold values may be thirty seconds, and when the duration is more than thirty minutes, the threshold values may be sixty seconds.

The method also includes, at 626, displaying a progress bar based on the progress bar display settings. The progress bar display settings include progress bar display options that depend at least partially on the change amount. The progress bar display options may specify a display location of the progress bar that depends on at least one characteristic of the media content. For example, where the media content includes a football game or other sports program, the display of media content may include a scoreboard or other statistical information associated with the media content at the top or bottom of the display screen. Accordingly, the progress bar display options may specify that the progress bar be displayed along sides of the display. The progress bar display options may also include a display size of the progress bar that depends on at least one characteristic of the media content. To illustrate, the display size of the progress bar may be determined based on whether the media content is presented in a 4×3 mode or a 16×9 mode. The progress bar may also include a display color of the progress bar that depends on at least one characteristic of the media content. For example, where the media content includes primarily a black background, the progress bar display options may select a white or other contrasting color with which to display the progress bar. In another example, the progress bar display options may include an opacity of the progress bar that depends on at least one characteristic of the media content. For example, where the media content includes a financial news program or a sports program, the progress bar may be displayed more translucently than at other times to allow the media content to be seen at least partially through the progress bar.

Figure 7:
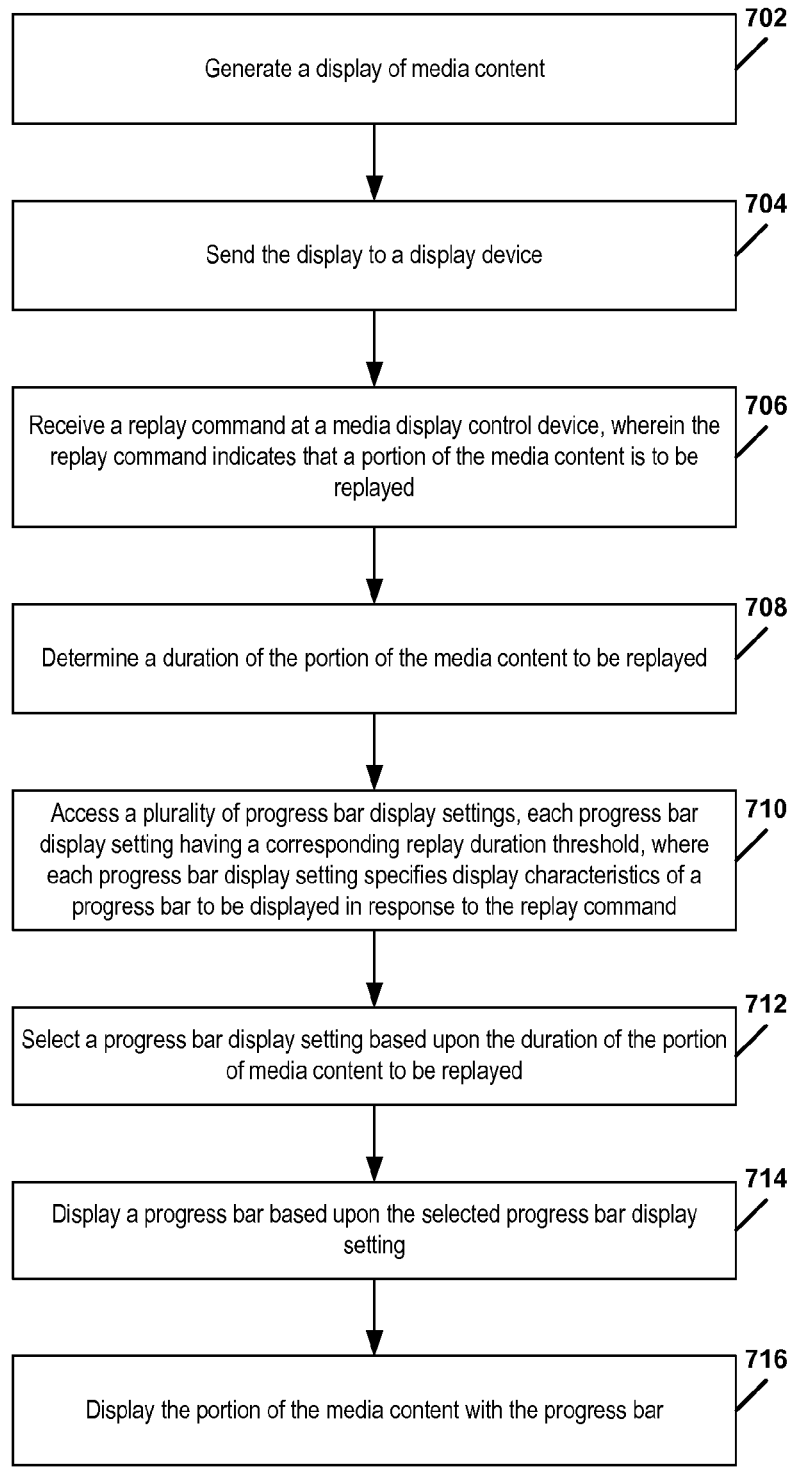
FIG. 7 is a flow diagram of a second particular embodiment of method of generating a progress bar display.

FIG. 7 depicts a flow diagram of a second particular embodiment of a method of generating a progress bar display. The method includes, at 702, generating a display of media content. The display of media content is sent to a display device, at 704. The method also includes, at 706, receiving a replay command at a media control device. The replay command indicates that a portion of the media content is to be replayed via the display device. The method also includes, at 708, determining a duration of the portion of media content to be displayed. The method includes, at 710, accessing a plurality of progress bar display settings. Each of the progress bar display settings may have a corresponding replay duration threshold. Each progress bar display setting specifies the display characteristics of the progress bar to be displayed in response to the replay command.

The method includes, at 712, selecting a progress bar display setting based on the duration of the portion of the media content to be replayed. The method further includes, at 714, displaying a progress bar based upon the selected progress bar display setting and, at 716, displaying the portion of media content to be replayed with the progress bar. In a particular embodiment, the selected progress bar display setting specifies a location of the progress bar with respect to the displayed portion of the media content. In another particular embodiment, the selected progress bar display setting specifies an opacity of the progress bar in the display that is determined based on the selected progress bar setting.

Figure 8:
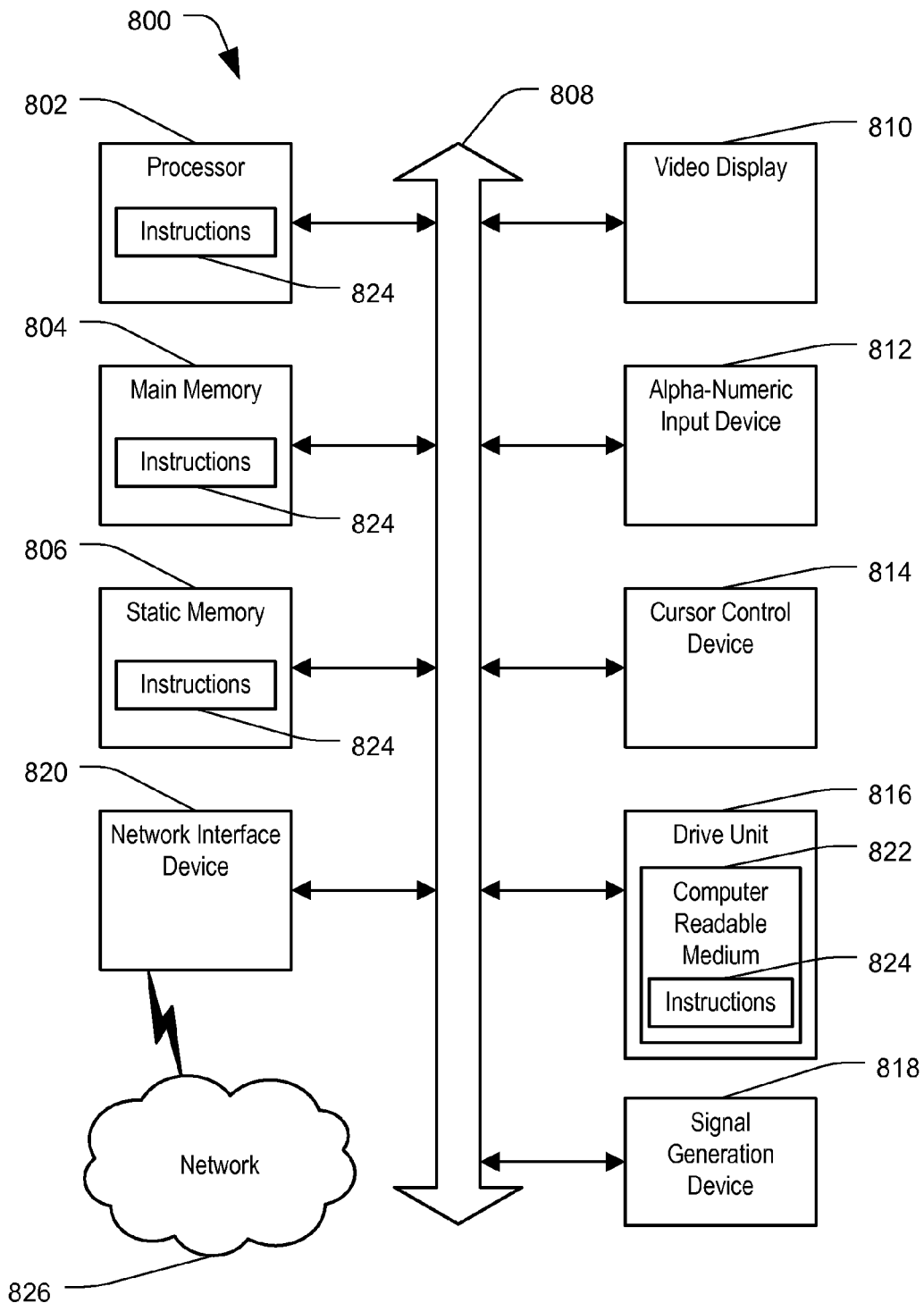
FIG. 8 is a block diagram of an illustrative embodiment of a general computer system.

Referring to FIG. 8, an illustrative embodiment of a general computer system is shown and is designated 800. The computer system 800 includes a set of instructions that can be executed to cause the computer system 800 to perform any one or more of the methods or computer based functions disclosed herein. The computer system 800, or any portion thereof, may operate as a standalone device or may be connected, e.g., using a network, to other computer systems or peripheral devices.

In a networked deployment, the computer system may operate in the capacity of a media content source, such as the media content source 104 and the media content control device 102 of FIG. 1. The computer system 800 can also be implemented as or incorporated into various devices, such as a personal computer (PC), a tablet PC, a router, a personal digital assistant (PDA), a mobile device, a palmtop computer, a laptop computer, a desktop computer, a communications device, network router, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics-processing unit (GPU), or both. Moreover, the computer system 800 can include a main memory 804 and a static memory 806 that can communicate with each other via a bus 808. As shown, the computer system 800 may further include a video display unit 810, such as a liquid crystal display (LCD), an organic light emitting diode (OLED), a flat panel display, a solid-state display, or a projection display. Additionally, the computer system 800 may include an input device 812, such as a keyboard, and a cursor control device 814, such as a mouse or a remote control. The computer system 800 can also include a disk drive unit 816, a signal generation device 818, such as a speaker or remote control, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered equivalent to a tangible storage medium. Accordingly, the disclosure is considered to include any one or more of a computer-readable storage medium and other equivalents and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, MPEG, SMPTE, H.264) represent examples of the state of the art. Such standards are periodically superseded by faster or more efficient equivalents having essentially the same functions. Accordingly, replacement standards and protocols having the same or similar functions as those disclosed herein are considered equivalents thereof The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving an input at a media display control device;
performing a media control function in response to the input, wherein the media control function causes the media display control device to change a playback parameter associated with displayed media content;
determining a control value corresponding to the media control function;
retrieving a threshold from a memory of the media display control device; and
based on the control value exceeding the threshold, displaying a progress bar associated with the media control function with the displayed media content.

2. The method of claim 1, wherein the media control function includes advancing the displayed media content and rewinding the displayed media content.

3. The method of claim 1, wherein the control value is based on an amount of change to the playback parameter associated with the media control function.

4. The method of claim 1, further comprising modifying an appearance of the progress bar based on progress bar settings.

5. The method of claim 4, wherein the progress bar settings include a threshold setting, wherein the threshold is based on the threshold setting.

6. The method of claim 4, wherein the progress bar settings include a progress bar display size setting, a progress bar display duration setting, a progress bar display color setting, a progress bar display opacity, or any combination thereof.

7. The method of claim 1, further comprising determining a progress bar display duration time period of the progress bar, wherein the progress bar and the media content are displayed, and wherein the progress bar is displayed during the progress bar display duration time period.

8. The method of claim 7, wherein the progress bar display duration time period is based on the control value.

9. The method of claim 1, wherein the media display control device is a set top box.

10. A computer-readable storage device comprising instructions that, when executed by a processor, cause the processor to perform operations comprising:
- receiving an input at a media display control device;
- performing a media control function in response to the input, wherein the media control function causes the media display control device to change a playback parameter associated with media content;
- determining a control value corresponding to the media control function;
- comparing the control value to a threshold; and
- based on the control value exceeding the threshold, displaying a progress bar associated with the media control function with the media content.

11. The computer-readable storage device of claim 10, wherein the media control function includes advancing the media content and rewinding the media content.

12. The computer-readable storage device of claim 10, wherein the operations further comprise generating progress bar display settings based on a characteristic of the media content, wherein the progress bar settings modify an appearance of the progress bar.

13. The computer-readable storage device of claim 12, wherein the characteristic of the media content indicates an aspect ratio of the media content, a playback time of the media content, or a format of the media content.

14. The computer-readable storage device of claim 12, wherein the progress bar display settings include a progress bar display location.

15. The computer-readable storage device of claim 12, wherein the progress bar display settings include a progress bar display size.

16. The computer-readable storage device of claim 12, wherein the progress bar display settings include a progress bar display color.

17. A device comprising:
- an interface to receive input to initiate a media control function;
- a media display controller to modify a playback parameter associated with media content in response to the media control function; and
- a display interface configured to:
  - send the media content to a display device without a progress bar associated with the media control function based on a control value associated with the media control function not exceeding a threshold; and
  - send the media content and the progress bar associated with the media control function to the display device based on the control value associated with the media control function exceeding the threshold.

18. The device of claim 17, wherein the media display controller includes a progress bar module to select progress bar display settings based on the control value.

19. The device of claim 17, wherein the media display controller is a wireless communication device.

20. The device of claim 17, wherein a position of the progress bar is determined based on a characteristic of the media content displayed concurrently with the progress bar.

* * * * *